No. 841,121. PATENTED JAN. 15, 1907.
J. F. CAVANAGH.
MACHINE FOR PREPARING RUBBER SHOES.
APPLICATION FILED MAR. 19, 1906.

WITNESSES:
G. C. Gilson.
John T. Schrott.

INVENTOR
John F. Cavanagh
BY
Fred G. Dieterich
ATTORNEYS.

No. 841,121. PATENTED JAN. 15, 1907.
J. F. CAVANAGH.
MACHINE FOR PREPARING RUBBER SHOES.
APPLICATION FILED MAR. 19, 1906.

WITNESSES:
F. C. Gibson.
John I. Schrotz INVENTOR
John F. Cavanagh.
BY
Fred J. Dieterich & Co.
ATTORNEYS No. 841,121. PATENTED JAN. 15, 1907.
J. F. CAVANAGH.
MACHINE FOR PREPARING RUBBER SHOES.
APPLICATION FILED MAR. 19, 1906.
7 SHEETS—SHEET 7.

WITNESSES:
F. C. Gibson.
John T. Schrott.

INVENTOR
John F. Cavanagh.
BY Fred G. Dieterich
ATTORNEYS.

UNITED STATES PATENT OFFICE.

JOHN F. CAVANAGH, OF PROVIDENCE, RHODE ISLAND, ASSIGNOR TO THE UNITED STATES RUBBER CO. OF NEW JERSEY, OF PROVIDENCE, RHODE ISLAND (INCORPORATED.)

MACHINE FOR PREPARING RUBBER SHOES.

No. 841,121. Specification of Letters Patent. Patented Jan. 15, 1907.

Application filed March 19, 1906. Serial No. 306,795.

*To all whom it may concern:*

Be it known that I, JOHN F. CAVANAGH, residing at Providence, in the county of Providence and State of Rhode Island, have invented a new and Improved Machine for Preparing Rubber Shoes, of which the following is a specification.

My invention relates to certain new and useful improvements in machines for molding and vulcanizing rubber boots and shoes, and it is particularly adapted to the manufacture of rubber shoes.

My invention has for its object to provide a machine of this character of a simple and effective construction in which the operative parts are so arranged as to be positive, quick, and effective in their operation and in which the various steps of the machine are automatically governed and regulated.

Generically, my invention includes a machine having a pair of separable molds coöperating with a third or end mold, automatically-operating means for opening and closing the molds, an automatically-expansible last for coöperating with the molds, means for raising and lowering the last, means for automatically stopping the machine at proper intervals, and means for automatically timing such stopping means to automatically throw the movable parts of the machine into operation at predetermined intervals, and further means for disconnecting the timing mechanism from operation when the molds are open, which latter means are adapted to be manually reset.

My invention also includes an improved means for raising and lowering the last from the molds, including an automatically connecting and disconnecting pipe member for transmitting steam into the last, and the machine also includes means for automatically cutting on and off the steam admission to the last at predetermined intervals.

With other objects than have been heretofore specified the invention also includes certain novel construction, combination, and arrangement of parts, all of which will be first described in detail and then be specifically pointed out in the appended claims, reference being had to the accompanying drawings, in which—

Fig. 6 is a detail plan section of the automatic governing mechanism for stopping the machine and the timing mechanism hereinafter specifically referred to. Fig. 7 is a vertical section on the line 7 7 of Fig. 6. Fig. 8 is a detail view of the lug-bearing cam-disk for raising and lowering the last and coöperating with the governing mechanism. Fig. 9 is a detail view of a portion of the timing-chain hereinafter specifically referred to. Fig. 15 is a detail sectional view of the steam-valve for controlling the supply of steam to the last.

Referring now to the accompanying drawings, in which like numerals of reference indicate like parts in all of the figures, 1 1 designate the side frame members, which may be bolted through the webs $1^a$ $1^a$ to the supports 2 2, and the side frame members 1 1 are each provided with seats $1^b$ $1^b$ to receive the bed-plate 3, that supports the last-carrying member. The bed-plate 3 is bolted or otherwise secured to the seats $1^b$ of the side frame portion 1 by bolts $1^c$ $1^c$, as shown. Each side frame member 1 is also provided with a longitudinal guideway $1^d$ to receive the longitudinally-sliding mold-carrying bars 4, to which the front mold-carrier 5 is secured in any approved manner.

Figures 2, 14:
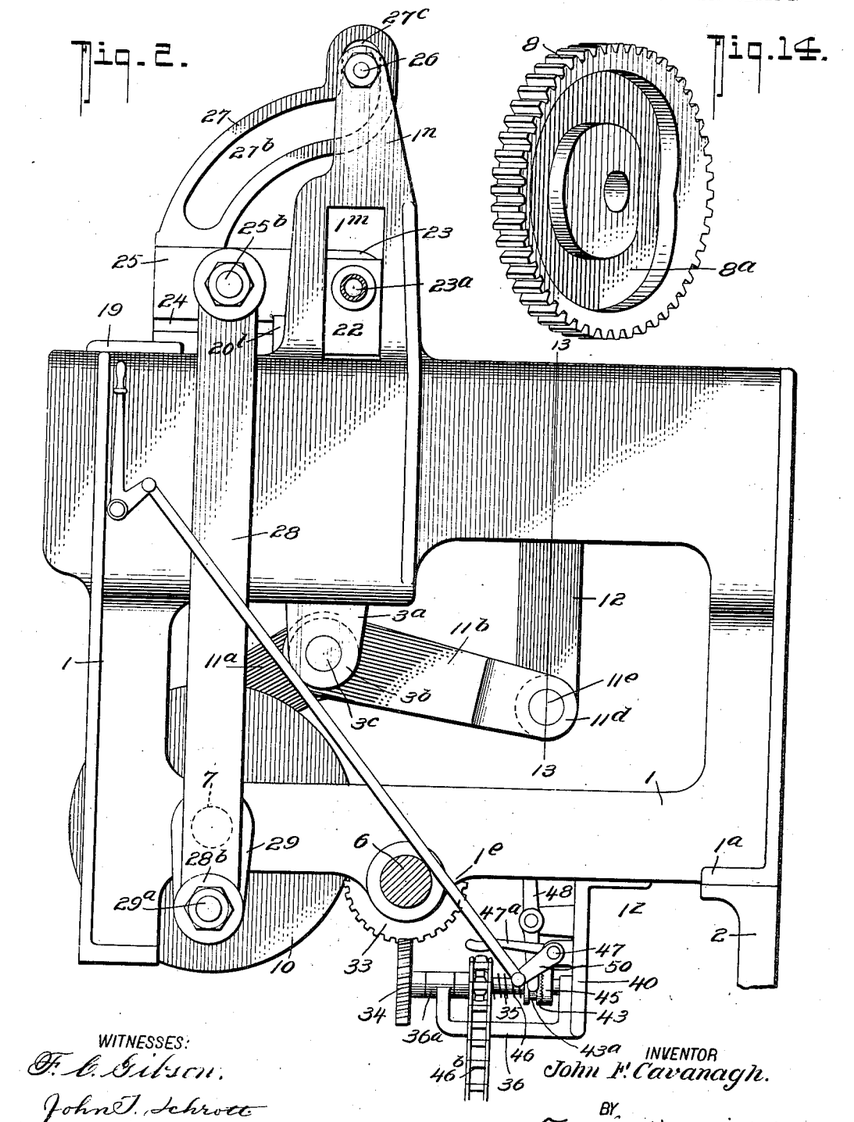
Fig. 2 is a side elevation of the machine looking in the direction of the arrow on Fig. 1.
Fig. 14 is a detail view of the cam-faced gear.
Figures 3, 5:
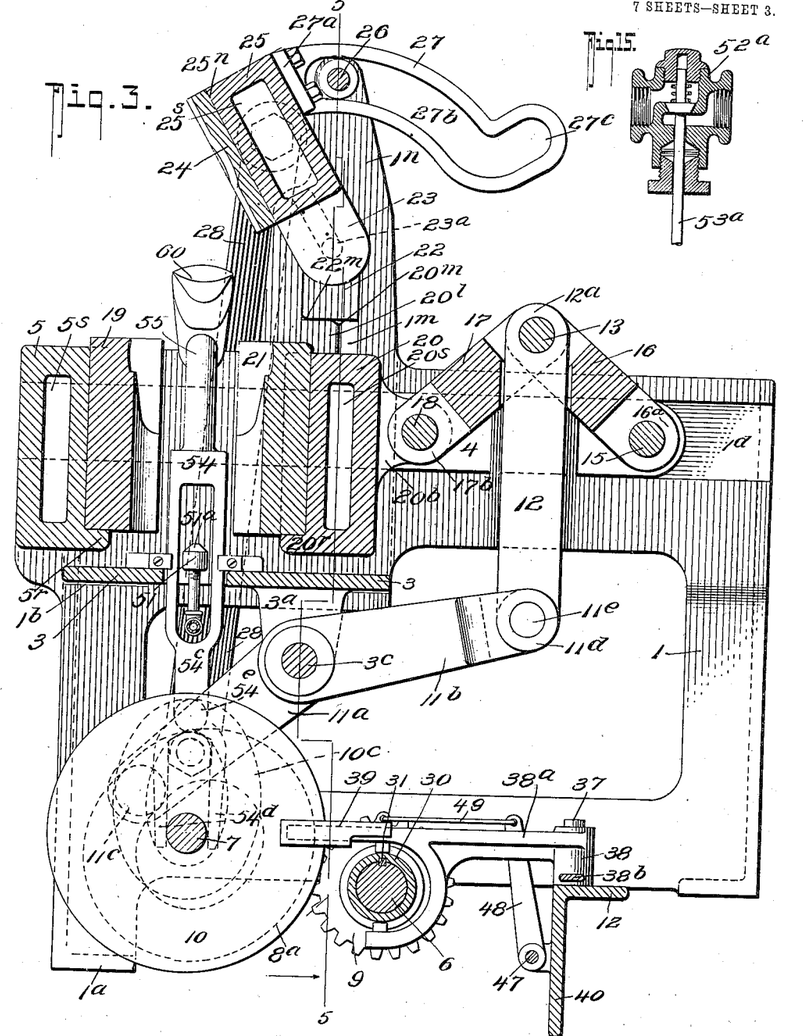
Fig. 3 is a central vertical longitudinal section taken on the line 3 3 of Fig. 1 and looking in the direction of the arrow on Fig. 1, showing the position of the parts when the molds are open.
Fig. 5 is a cross-section taken on the line 5 5 of Fig. 3 looking in the direction of the arrow.

The main drive-shaft 6 of the machine, which is driven from any suitable source of power-supply, (not shown,) is mounted in bearings $1^e$ in the side frames 1, as clearly indicated in Figs. 2 and 3 of the drawings.

7 designates the cam-carrying shaft, which is mounted in bearings $1^f$ $1^f$ in the side frame members 1, and the shaft 7 carries a gear-wheel 8, that meshes with a gear-wheel 9 on the shaft 6, the gear-wheel 9 running loosely on the shaft 6 for a purpose presently understood. The shaft 7 also carries a cam-disk 10, provided on one face with a pair of lugs $10^a$ $10^b$ and on its other face with a cam-groove $10^c$ for a purpose presently explained. The cam-gear 8 is also provided with a cam-groove $8^a$ in one face for a purpose likewise presently to be explained.

Figure 1:
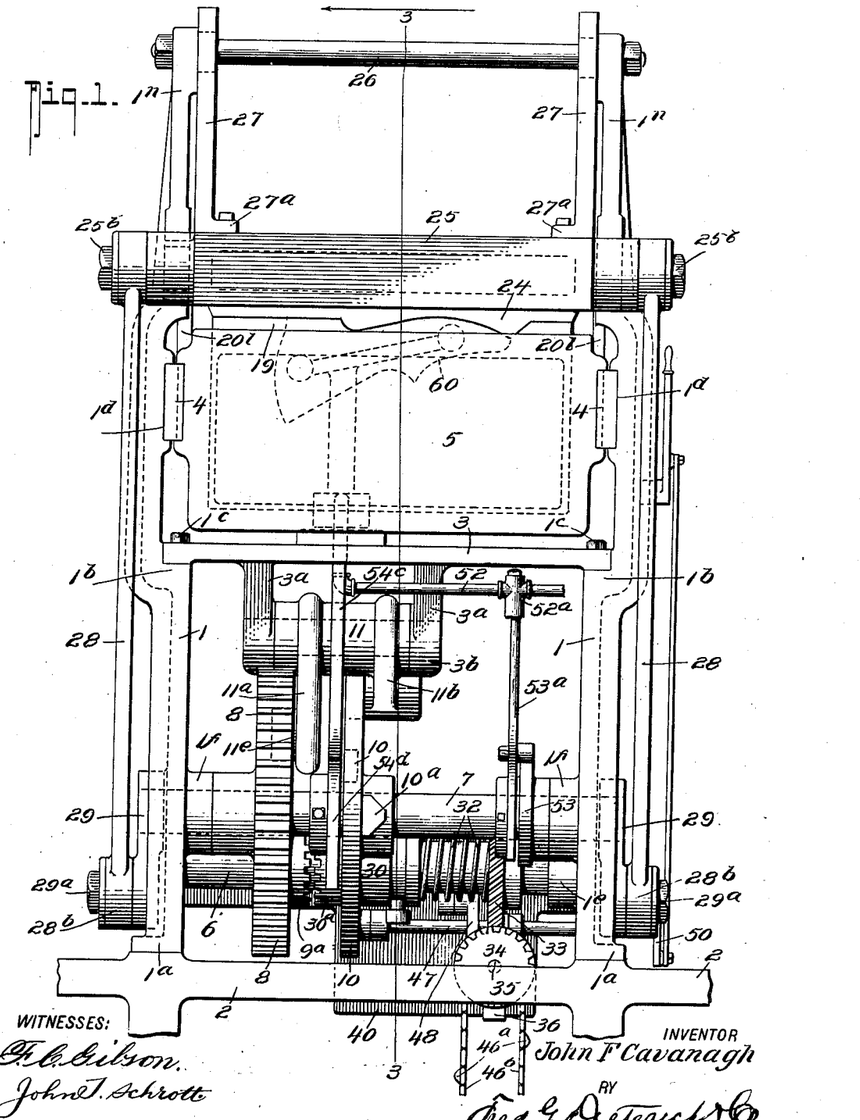
Figure 1 is an end elevation of my machine.
Figure 13:
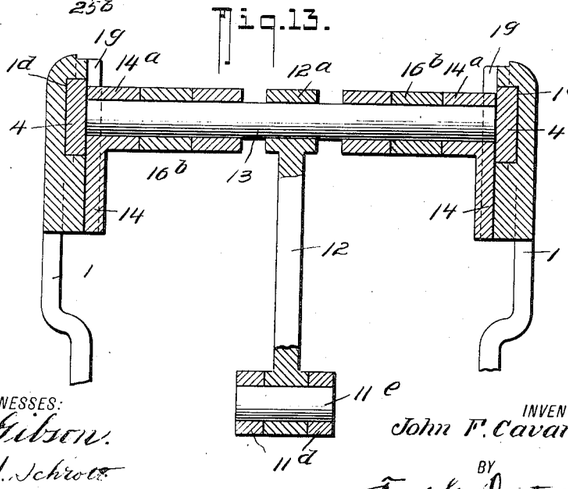
Fig. 13 is a detail cross-section on the line 13 13 of Fig. 2.
Figure 16:
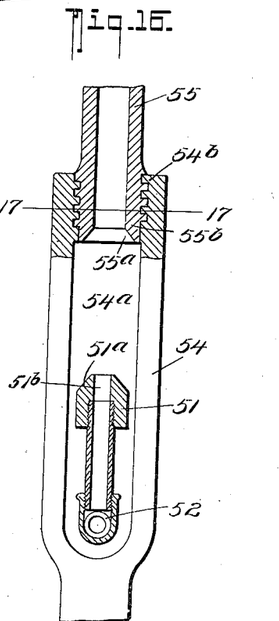
Fig. 16 is a detail sectional view of the last-support carrier.
Figure 17:
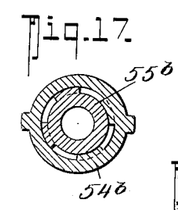
Fig. 17 is a detail cross-section on the line 17 17 of Fig. 16.

Projecting downwardly from the bed-plate 3 is a pair of lugs $3^a$ $3^a$, having bearing portions $3^b$ to receive a shaft $3^c$, upon which a sleeve 11 is mounted, and the sleeve 11 carries a pair of arms $11^a$ $11^b$, forming, as it were, a bell-crank lever, the arm $11^a$ carrying a friction-roller $11^c$, that enters and coöperates with the cam-groove $8^a$ in the gear 8, as will be clearly understood by reference to Figs. 1 and 14 of the drawings. The end of the arm $11^b$ is preferably bifurcated and formed with bearing portions $11^d$ to receive the pin $11^e$, upon which a link-rod 12 is mounted at one end with its end between the bifurcated portions of the lever $11^b$. The link-rod 12 has its other end provided with a bearing $12^a$ to receive a shaft 13, that has its ends held in bearing portions $14^a$ in vertically-slidable guide members 14, that are vertically slidably held in a groove $1^g$ on the frame members 1, as clearly shown in Figs. 4 and 13.

Figure 4:
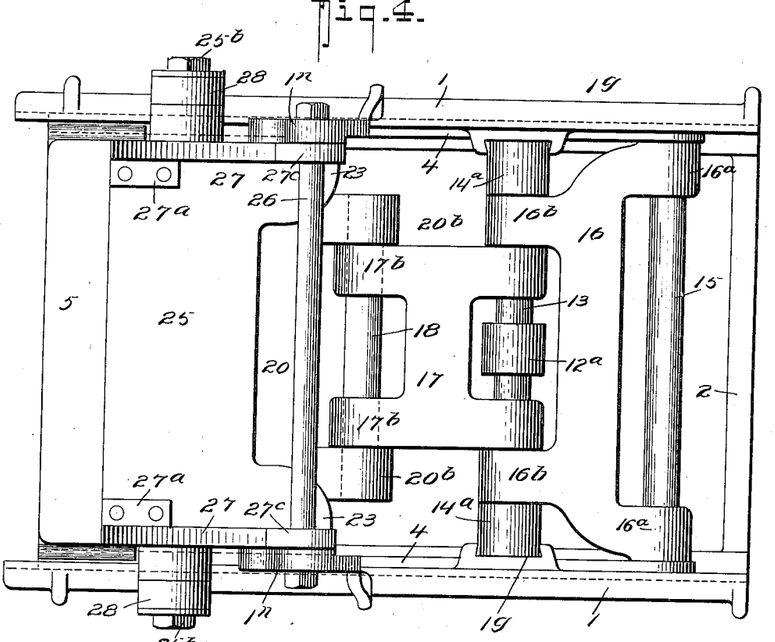
Fig. 4 is a top plan view of the machine, showing the parts in the position shown in Fig. 2, with the molds closed.
Figure 5:
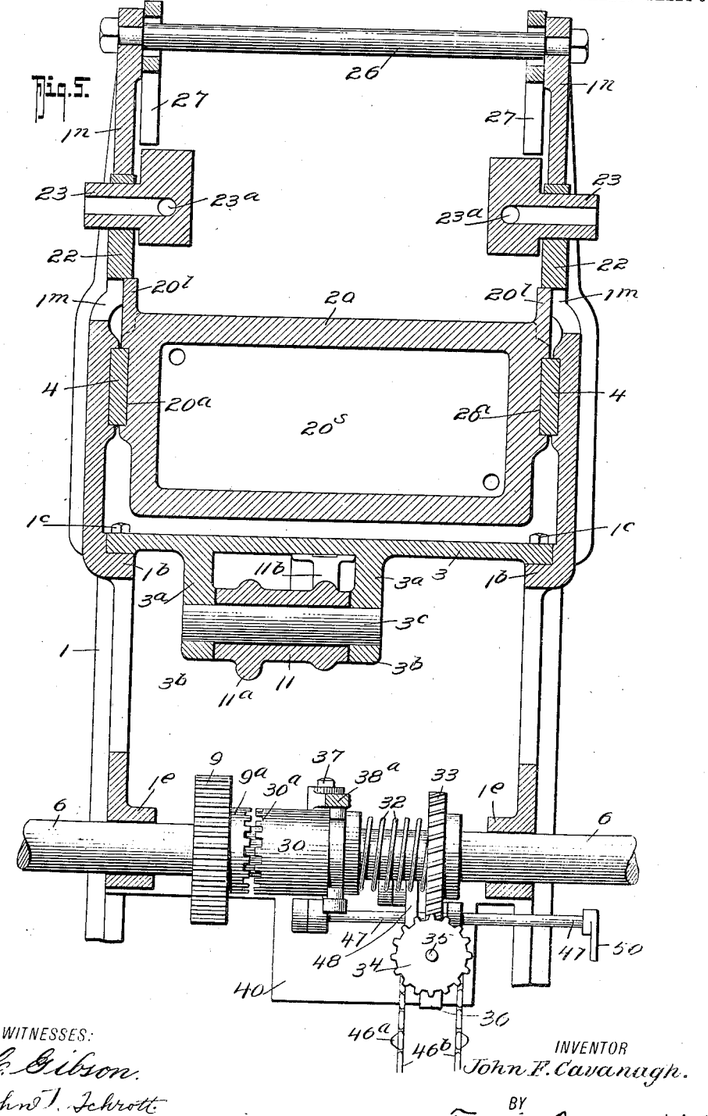

15 designates a shaft mounted with its ends held in bearing-apertures in the sliding bars 4, hereinbefore referred to, and the shaft 15 also passes through bearing portions $16^a$ of a toggle-link member 16, which has bearing portions $16^b$ at its other end to receive the shaft 13, as clearly indicated in Fig. 4 of the drawings.
The rear mold-carrier 20 has grooves $20^a$ to permit passage of the sliding bars 4, which serve to support the mold-carrier 20 in position, and the carrier 20 has a pair of rearwardly-projecting ears $20^b$ $20^b$, having bearing-apertures to receive a shaft 18, which is carried thereby and which passes through bearing portions $17^b$ of a second toggle-link member 17, which is also provided at its other end with bearings $17^a$ to receive the shaft 13.

The front and rear mold-carriers are provided with suitable steam-chambers $5^s$ and $20^s$, into which steam may be admitted in any approved manner, and the said mold-carriers 5 and 20 are also provided with mold-receiving portions $5^r$ $20^r$ to receive the mold-sections 19 and 21, respectively, which mold-sections are provided with cavities, each of which is in the form of one-half shoe-upper.
The mold-carrier 20 has a pair of lugs $20'$ $20'$, which coöperate with bearing-blocks 22 22, that are vertically slidable in elongated slots $1^m$ $1^m$ in vertically-extended portions $1^n$ $1^n$ of the frame members 1, and the bearing-blocks 22, together with the lugs $20'$, have chamfered or beveled edges $20^m$ and $22^m$ for a purpose readily understood by reference to the drawings. Mounted in the bearing-blocks 22 are trunnions 23, formed with the sole-mold carrier 25, which has a steam-chamber $25^s$, corresponding to the chambers $5^s$ and $20^s$ of the mold-carriers 5 and 20, respectively, and the mold-carrier 25 is provided with a mold-receiving face $25^r$ to receive the sole-forming mold 24, that is provided with a cavity to form the sole portion of the shoe, the latter operation of the machine being more fully explained later.

Secured to the upwardly-projecting portions $1^n$ of the frame 1 at the top thereof is a transverse rod 26, which lies parallel to the axis of the trunnion 23 and passes through a slot $27^b$ in the guide-cam member 27, that is bolted or otherwise secured at $27^a$ to the mold-carrier 25, one guide 27 being secured at each side of the mold-carrier 25, as shown. The elongated slot $27^b$ of the guide 27 has a portion formed in a circular arc having as its center the axis of the trunnion 23 and terminates in a portion $27^c$, which lies in a vertical direction when the mold-carrier 25 is horizontal, for a purpose presently explained.

Pivotally secured to lugs $25^b$ on each side of the mold-carrier 25 is a pitman-rod 28, that projects downwardly toward the shaft 7 and terminates in the bearing portion $28^b$, that receives the wrist-pin $29^a$ of the crank-arm 29, that is secured to the shaft 7 at its outer end, whereby the motion of the shaft 7 serves to reciprocate the pitman 28 to open and close the sole-mold in a manner presently to be fully explained.

The trunnions 23 are of tubular form and have passages $23^a$, which communicate with the steam-chamber $25^s$ of the mold-carrier 25 and to which the steam inlet and outlet pipes (not shown) connect.

The gear-wheel 9, as has been heretofore stated, is loosely mounted on the shaft 6 and is also provided with a clutch-face $9^a$, that coöperates with a corresponding clutch-face $30^a$ of a sleeve 30, mounted on the shaft 6, and coöperatively connected thereto by a spline 31, the collar 30 being forced with its clutch-face $30^a$ into engagement with the clutch-face $9^a$ by a spring 32 on the shaft 6, as shown.

Carried by the shaft 6 is a worm or spiral gear 33, which meshes with a similar gear 34, carried by a shaft 35, that is mounted in bearings $36^a$ of a bracket 36 at right angles to the shaft 6 for a purpose presently explained.

37 designates a stud projected upwardly from a transverse beam $1^z$ of the frame 1, upon which stud 37 a bearing-sleeve 38 is mounted, and the sleeve 38 carries a long arm $38^a$, upon the outer end of which a cap member 39 is slidingly held. The cap member 39 has a lug portion $39^a$ for coöperating with the lugs $10^a$ $10^b$ of the disk $10^c$ hereinbefore referred to in a manner which will be explained later. The collar 38 also carries a short arm 38$^b$, that projects at right angles to the arm 38$^a$ and terminates in a portion provided with an elongated eye 38$^c$, as shown. Mounted on a stud 40$^a$ on a bracket 40, that projects from the plate 1$^z$, is a lever 41, whose upper end is apertured to receive the hook portion 42$^a$ of a connecting-rod 43, which has an elongated eye 42$^b$, that coöperates with the eye 38$^c$ of the short arm 38$^b$, before referred to. The lower portion of the lever 41 is bifurcated and provided with friction-rollers to enter the groove 43$^a$ in the shifting clutch member 43, mounted on the shaft 35 and coöperatively connected to the timing-chain sprocket 44, loosely mounted on the shaft 35, the clutch 43 having a clutch-face to coöperate with the clutch-face of a second clutch member 45, fixedly secured to the shaft 35 to turn therewith.

A coil-spring 46 is provided to maintain the clutch members 43 and 45 in engagement with one another, so that the sprocket 44 will turn with the shaft 35 normally. An endless chain 46$^b$, having suitably spaced risers 46$^a$, passes over the sprocket-wheel 44 and coöperates with an arm 47$^a$, carried by a shaft 47, mounted in bearings projecting from the plate 1$^z$, which shaft 47 also carries a long arm 48, that is coöperatively connected with the sliding cap 39 by a connecting-rod 49, as indicated, the arms 47$^a$ and 48 acting together as a bell-crank lever. The shaft 47 is projected to the outside of the machine and carries a lever 50 at its end, whereby the shaft 47 can be manually turned for a purpose presently explained.

Within the cap member 39 and abutting the end wall thereof and the end wall of the long arm or lever 38 is a coil-spring for tending to project the cap member toward the end of the arm 38, so that it will be held with its lug 39$^a$ in the path of the lugs 10$^a$ 10$^b$. It will be also noticed that the lug 10$^a$ is of shorter length than the lug 10$^b$, and the reason for this construction will be explained hereinafter.

Mounted on the bed-plate 3 is a coupling-block 51, having a conical seat 51$^a$ and an aperture 51$^b$, to which the steam-inlet pipe 52 is connected, and the pipe 52 projects to one side of the central plane of the machine and connects through a valve 52$^a$ with the source of steam-supply. (Not shown.) The valve 52$^a$ is opened at predetermined and proper intervals through the medium of the cam 53 on the shaft 7 and that operates the rod 53$^a$ that connects with the valve-stem of the valve 53$^a$, whereby when the cam forces the rod 53$^a$ up the valve 52$^a$ will be opened to admit passage of steam through the coupling-block 51 into the last, as will be more clearly understood presently.

54 designates a last-support carrier, having a slot 54$^a$ to permit passage of the coupling-block 51 and having its upper end provided with a seat 54$^b$, that is threaded with "quarter-turn threads" of the "breech-block" type to coöperate with a similarly-threaded end 55$^b$ of the last-supporting stem 55, which stem 55 terminates in a conical seat 55$^a$ for coöperating with the conical seat 51$^a$ of the coupling-block 51 to form a steam-tight connection therewith. The last-supporting carrier 54 is also provided with a downwardly-projecting portion 54$^c$, terminating in a forked end 54$^d$, and is provided with a cam-roller 54$^e$, that is adapted to enter the cam-groove of the cam-disk 10 and coöperate therewith.

The last-supporting stem 55 is hollow and communicates with the aperture 51$^b$ of the block 51 when in engagement with said block, so that the steam from the pipe 52 will pass through stem 55 into the pipe member 56 and into the laterals 56$^a$ 56$^b$ at each end of the pipe 56.

The shoe-last 60 is in the form of my invention illustrated in the accompanying drawings, composed of two sections 60$^a$ 60$^a$, each of similar form and divided on a central vertical longitudinal plane, the line of division that passes through the last in the central plane thereof being guarded by a plate 61, that is secured to one of the sections 60$^a$ and overlaps the other section, suitable grooves being provided in the faces of the sections to receive the plate 61. Each section 60$^a$ is provided with internally-projecting lugs 60$^c$ 60$^c$, terminating in pistons 60$^d$, that are slidably held in the laterals 56$^a$ 56$^b$ of the pipe-section 56, whereby when steam is admitted through the stem 55 into the pipe 56 the steam-pressure will force the pistons 60$^d$ apart and separate the respective sections of the last.

In the present form of my invention the last 60 is held in a plane transverse to the central longitudinal plane of the machine, as indicated in dotted lines in Fig. 1.

From the foregoing description it is thought the construction of my invention will be readily understood by those skilled in the art and the manner in which my invention operates can be best explained as follows.

Operation: Assume the parts to be in the position shown in Fig. 3, with the molds open and the last ready to receive the material for forming. In this position of parts the machine is at rest, the clutch-faces 9$^a$ and 30$^a$ are separated in the position shown in Fig. 6, and the lug 10$^b$ in engagement with the lug 39$^a$, the timing device being thrown out of gear by reason of the lever 41 shifting the clutch 43 out of engagement with the clutch 45, as shown in Fig. 7. In this position the pitman 28 will be at the upward limit of its stroke and the arm 11$^a$ will be in the position indicated to force the toggle-links 16 and 17 into the position shown in Fig. 3. At this time the last-carrier has ejected the last from between the molds 19 and 21 as to be freely accessible to the operator. The operator then gives the last a quarter-turn to disconnect the stem 55 from the last-support carrier 54 and removes the same. He then places the materials upon the last and returns it to the position shown in Fig. 3. After the last has been returned to the last-carrier 54 and locked into position the operator throws the lever 50 to turn the shaft 47 to release the cap member 39 from connection with the lug $10^b$, thus permitting the spring 32 to force the clutch 30 into engagement with the clutch on the gear 9 or the shaft 6, thus imparting motion to the shaft 7 through the gear 8 and setting the machine in operation. As the machine begins to operate the pitman 28 will draw down on the sole-mold carrier 25 and turn it on its trunnions 23, it being understood that the block 22 is prevented from dropping during this action by the lug or stop $20'$ on the mold-carrier 20. The downward motion of the pitman 28 turns the mold-carrier 25 on its trunnions 23 until it assumes a horizontal position. Simultaneously with the downward motion of the pitman-rod 28 the cam-gear 8 will cause the bell-crank lever formed by the arms $11^a$ $11^b$ to draw down the link-rod 12 and return the toggle-links 16 and 17 to their horizontal positions to lie in the same plane, thus forcing the mold-carriers 5 and 20 toward each other and the central plane containing the last. It should be understood, however, that just prior to the closing of the molds toward each other the cam-disk 10 will draw down the last-support carrier and bring the last into operative alinement with the molds 19 and 21 and simultaneously close the connection between the seats $55^a$ $51^a$. By the time the mold-carrier 25 has reached a horizontal position, the mold-carriers 5 and 20 will have reached the limit of their movement and closed together over the last and during the remainder of the downward stroke of the pitman-rod 28 the carrier 25 will be moved vertically downward while in a horizontal position and closed over the sole portion of the last. As soon as the molds have closed fully over the last that carries the material to be formed into a shoe the cam 53 will operate the rod that opens the valve in the steam-feed to the last to permit steam being fed into the last under pressure. This steam serves to force the last-sections apart and squeeze the rubber into shape and into a layer of an even thickness throughout, it being understood that the rubber will be prevented from forcing itself into the last by reason of the cloth-covering over the last, which forms the lining of the shoe, and by reason of the guard-plate that forms the dividing-line of the last.

Figure 6:
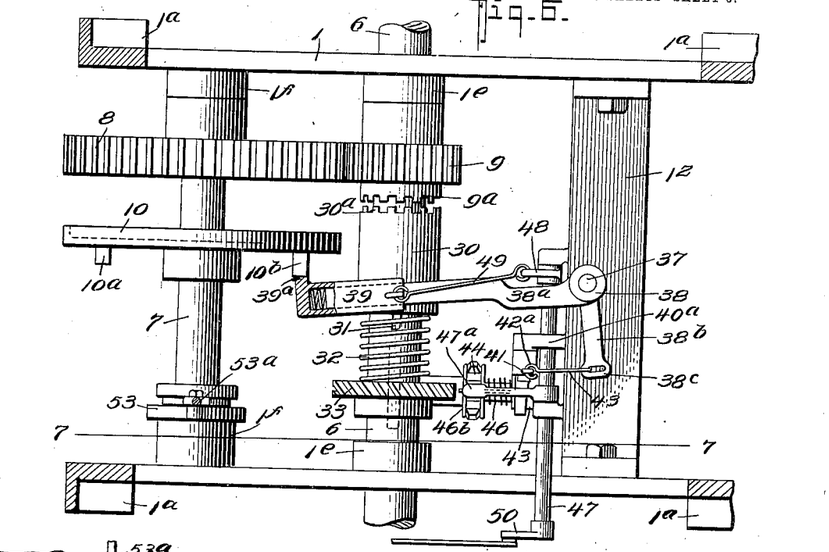
Figures 7, 8, 9:
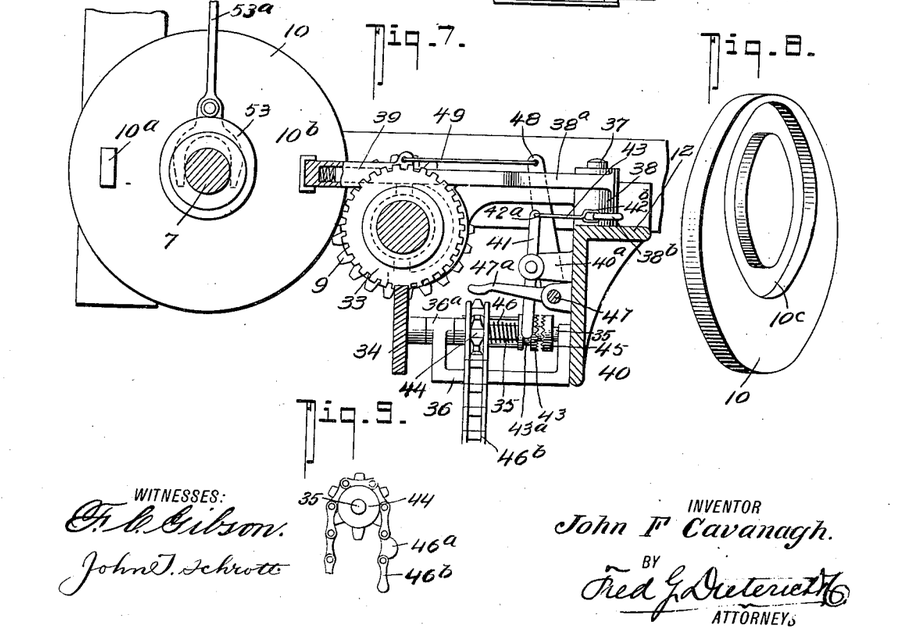
Figure 10:
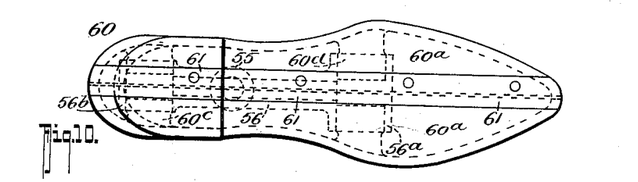
Fig. 10 is an enlarged plan view of one form of last.
Figure 11:
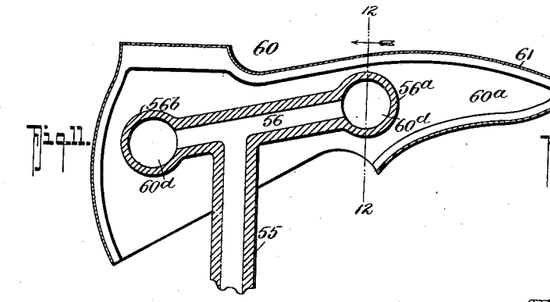
Fig. 11 is a central vertical section thereof.
Figure 12:
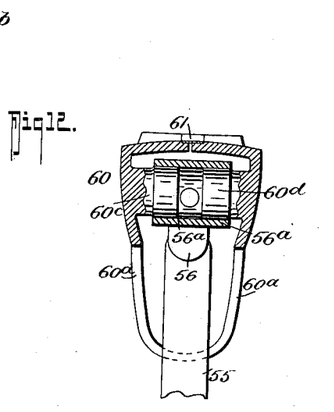
Fig. 12 is a transverse section taken on the line 12 12 of Fig. 11 looking in the direction of the arrow.

It should be mentioned that as soon as the mold-carriers have been moved to their final position to close the various molds against the last the lug $10^a$ will engage the lug $39^a$ and move the lever or arm $38^a$ into the position shown in Fig. 6 to disconnect the clutch 30 from the gear 9, thus stopping the operation of the shaft 7 and its coöperatively-attached parts. The shaft 7 remains at rest only during a predetermined interval corresponding to the distance between adjacent risers $46^a$ on the timing-chain 46, for as soon a sa riser $46^a$ engages the lever $47^a$ the same will impart motion to said lever, and in consequence turn the shaft 47 to cause the lever 48 to pull on the rod 49 and draw the cap member 39, with its lug $39^a$, out of engagement with the lug $10^a$, thus permitting the clutch 30 to again engage the gear 9 and set the shaft in rotation. As soon as the shaft 7 begins to rotate again the pitman 28 will raise the mold-carrier 25 and the sole-mold upwardly, a part of such upward motion being vertically upward, while the mold remains in a horizontal position, until the friction-roller on the rod 28 leaves the slot portion $27^c$ and begins to enter the slot portion $27^b$ and until the block 22 reaches the upward limit of its movement. As soon as this occurs the remainder of the upward movement on the rod 28 will cause the mold-carrier 25 to turn on its trunnions 23 until it again assumes the position shown in Fig. 3. As soon as the mold 25 has reached the limit of its vertical movement while horizontal and begins to turn on its trunnions 23 the molds 19 and 21 will begin to open through the medium of the toggle-links and their connection with the cam-gear, the molds 19 and 21 reaching the limit of their opening movement about the same time the mold 24 reaches the position shown in Fig. 3. As soon as the molds 19 and 21 have opened sufficiently the cam-disk 10 will cause the last-support carrier to rise and disconnect the seats $55^a$ $51^a$. This rising of the last support-carrier will continue until the last has been moved to its position shown in Fig. 3, and it can then be removed by turning the same one-quarter revolution and pulling it out. It should be remarked, however, that prior to the opening of the molds the cam 53 releases the steam-controlled valve in the pipe 52 to close the same and cut off the steam in the last. As soon as the parts have again reached the position shown in Fig. 3 the lug or stop $10^b$ will have again engaged the lug $39^a$ and thrown the gear 9 out of operative connection with the shaft 6 and will have also disconnected the timing-chain from operation through the medium of the clutches 43 and 45.

It should be stated that in closing down from the position shown in Fig. 3 the mold-carrier 25 is turned on its trunnions to a horizontal position, and then through the remainder of its closing-down movement the mold-carrier 25 moves vertically downward while lying in a horizontal plane. The reason that the turning motion on the trunnions takes place first in closing down is that the lug 20' holds the block 22 up and releases the block 22 as soon as the mold-carrier 25 is in a horizontal position.

It should be stated that the time during which the machine is at rest when the molds are closed is so adjusted as to allow the vulcanizing process to be properly performed. The steam is retained in the mold-carriers during the entire operation of the machine, although it is cut off from the last when the last is raised up to its mold-engaging position.

From the foregoing description, taken in connection with the accompanying drawings, it is thought the complete construction, operation, and many advantages of my invention will be readily understood by those skilled in the art to which it appertains, and I desire it understood that I do not limit myself to the exact features of construction herein set forth and wish it further understood that the terms used herein are to be considered as used in their broadest possible sense in view of the prior art.

What I claim is—

1. In a machine of the class described, a last member adapted to receive the material, a pair of "upper-molds," and a "sole-mold" for coöperating with said last, means for opening and closing said molds over said last, means for admitting steam into the last when the molds are closed, means for stopping the machine during a predetermined interval while the molds are closed, and means for stopping the machine when the molds are opened, substantially as shown and described.

2. In a machine of the class described, a last member adapted to receive the material, a pair of "upper-molds," and a "sole-mold" for coöperating with said last, means for opening and closing said molds over said last, means for admitting steam into the last when the molds are closed, means for stopping the machine during a predetermined interval while the molds are closed, means for stopping the machine when the molds are opened, and means for raising the last out of the molds when opened, substantially as shown and described.

3. In a machine of the class described, a last member adapted to receive the material, a pair of "upper-molds," and a "sole-mold" for coöperating with said last, means for opening and closing said molds over said last, means for admitting steam into the last when the molds are closed, means for stopping the machine during a predetermined interval while the molds are closed, means for stopping the machine when the molds are opened, said last comprising a pair of separable members and steam-controlled means for separating said separable members when the molds are closed to squeeze the material on the last into shape, substantially as shown and described.

4. In a machine of the class described, the combination with a last, a pair of "upper-molds," and a "sole-mold," means for moving said "upper molds" simultaneously toward or from the central plane of the last to close or open the same around the last, means for moving the "sole-mold" toward or from the last as the "upper-molds" move correspondingly, said "sole-mold" being pivotally mounted, a part of its motion being in a plane at right angles to the horizontal, while lying in a horizontal position, and the remainder of its motion being on an arc of a circle having as its center the pivot-axis of the "sole-mold," and means for stopping the machine at intervals, substantially as shown and described.

5. In a machine of the class described, the combination with a last, a pair of "upper-molds," and a "sole-mold," means for moving said "upper-molds" simultaneously toward or from the central plane of the last to close or open the same around the last, means for moving the "sole mold" toward or from the last as the "upper-molds" move correspondingly, said "sole-mold" being pivotally mounted, a part of its motion being in a plane at right angles to the horizontal while lying in a horizontal position and the remainder of its motion being on an arc of a circle having as its center the pivot-axis of the "sole-mold," means for stopping the machine at intervals, and means for restarting the machine at intervals, substantially as shown and described.

6. In a machine of the class described, the combination with a last, a pair of "upper-molds," and a "sole-mold," means for moving said "upper-molds" simultaneously toward or from the central plane of the last to close or open the same around the last, means for moving the "sole-mold" toward or from last as the "upper-molds" move correspondingly, said "sole-mold" being pivotally mounted, a part of its motion being in a plane at right angles to the horizontal while lying in a horizontal position and the remainder of its motion being on an arc of a circle having as its center the pivot-axis of the "sole-mold," means for stopping the machine at intervals, means for restarting the machine at intervals, and means for disconnecting said restarting means at predetermined times, substantially as shown and described.

7. In a machine of the class described, the combination with a supporting-frame, of a pair of bars longitudinally slidable in grooves in the supporting-frame, an "upper-mold" secured to said bars, a second "upper-mold" having grooves to permit passage of said bars and supported thereon, toggle-link connections between said bars and said second mold, guide-bars moving in grooves in said frame at right angles to said first-mentioned frame-grooves, and coöperatively connected with said toggle-links, means for operating said toggle-links at predetermined intervals to open and close said molds, a pair of sliding blocks mounted in bearings in said frame, a "sole-mold" pivotally mounted in said sliding blocks, means for opening and closing said "sole-mold," part of the movement of said "sole-mold" being in a plane at right angles to the horizontal, while lying in a horizontal plane, and the remainder of its movement being on an arc having as its center the pivot-axis of the "sole-mold," a last member, means for supporting said last member in alinement with said molds, means for moving said last member out of alinement with said molds when the molds are open, and means for stopping and starting the machine at predetermined intervals, substantially as shown and described.

8. In a machine of the class described, the combination with a supporting-frame, of a pair of bars longitudinally slidable in grooves in the supporting-frame, an "upper-mold" secured to said bars, a second "upper-mold" having grooves to permit passage of said bars and supported thereon, toggle-link connections between said bars and said second mold, guide-bars moving in grooves in said frame at right angles to said first-mentioned frame-grooves, and coöperatively connected with said toggle-links, means for operating said toggle-links at predetermined intervals to open and close the said molds, a pair of sliding blocks mounted in bearings in said frame, a "sole-mold" mounted in said sliding blocks, means for opening and closing said "sole-mold," part of the movement of said "sole-mold" being in a plane at right angles to the horizontal while lying in a horizontal plane, and the remainder of its movement being on an arc of a circle having as its center the pivot-axis of the "sole-mold," a last member, means for supporting said last member in alinement with said molds, means for moving said last member out of alinement with said molds when the molds are open, means for stopping and starting the machine at predetermined intervals, and timing means for said starting and stopping means substantially as shown and described.

9. In a machine of the class described, the combination with a plurality of molds, and means for opening and closing said molds, of a last, a last-support carrier, connections of the "breech-block" type between the last and last-support carrier whereby the last can be removed from the carrier, means for admitting steam into said last, and means for connecting and disconnecting the steam-supply from the last and moving the last out of alinement with the molds when open, substantially as shown and described.

10. In a machine of the class described, the combination with a plurality of molds, and means for opening and closing said molds, of a last, a last-support carrier, connections of the "breech-block" type between the last and last-support carrier whereby the last can be removed from the carrier, means for admitting steam into said last, means for connecting and disconnecting the steam-supply from the last and moving the last out of alinement with the molds when open, said last comprising a pair of separable members, steam-controlled means for separating said members when the molds are closed around the last, substantially as shown and described.

11. In a machine of the class described, the combination with a pair of oppositely-disposed "upper-molds" and a "sole-mold" at right angles thereto, and means for automatically opening and closing said molds at intervals, of a last, means for normally supporting said last in alinement with said "upper-molds," means for moving the said last out of alinement with said "upper-molds" when the molds are opened, said last comprising a pair of separable members, means for admitting steam into said last to separate the members when the molds are closed and to heat the last, means for admitting steam into the molds, means for maintaining the molds closed during predetermined intervals of time, and means for stopping the machine when the molds are opened, substantially as shown and described.

12. In a machine of the class described, the combination with a pair of oppositely-disposed "upper-molds" and a "sole-mold" at right angles thereto, and means for automatically opening and closing said molds at intervals, of a last, means for normally supporting said last in alinement with said "upper-molds," means for moving said last out of alinement with said "upper-molds" when the molds are opened, said last comprising a pair of separable members, means for admitting steam into said last to separate the members when the molds are closed and to heat the last, means for admitting steam into the molds, means for maintaining the molds closed during predetermined intervals of time, means for stopping the machine when the molds are opened, and manually-operating means for restarting the machine after the same has been stopped when the molds are opened, substantially as shown and described.

13. In a machine of the class described, the combination with a last and a plurality of molds for coöperating therewith, of means for opening and closing said molds and means for raising and lowering said last as the molds are opened and closed, means for stopping said mold opening and closing means and said last raising and lowering means during a predetermined interval when the molds are closed and the last lowered, substantially as shown and described.

14. In a machine of the class described, the combination with a last and a plurality of molds for coöperating therewith, of means for opening and closing said molds and means for raising and lowering said last as the molds are opened and closed, means for stopping said mold opening and closing means and said last raising and lowering means during a predetermined interval when the molds are closed and the last lowered, and means for positively stopping said opening and closing means and said last raising and lowering means when the molds are opened and the last raised, substantially as shown and described.

15. In a machine of the class described, the combination with a last and a plurality of molds coöperating therewith, of means for opening and closing said molds around said last, said means including a rotatable shaft and connections between said rotatable shaft and said molds, a drive-shaft, gear connections between said drive-shaft and said first-mentioned shaft, means for disconnecting said first-mentioned shaft from said drive-shaft at times, and timing means for releasing said disconnecting means at predetermined intervals, substantially as shown and described.

16. In a machine of the class described, the combination with a last and a plurality of molds coöperating therewith, of means for opening and closing said molds around said last, said means including a rotatable shaft and connections between said rotatable shaft and said molds, a drive-shaft, gear connections between said drive-shaft and said first-mentioned shaft, means for disconnecting said first-mentioned shaft from said drive-shaft at times, timing means for releasing said disconnecting means at predetermined intervals, and means for disconnecting said timing means at predetermined times, substantially as shown and described.

17. In a machine of the class described, the combination with a two-part separable last and a plurality of molds for coöperating therewith, of means for admitting steam into said last to separate the sections thereof when the molds are closed, substantially as shown and described.

18. In a machine of the class described, the combination with a two-part separable last and a plurality of molds for coöperating therewith, of means for admitting steam into said last to separate the sections thereof when the molds are closed, means for opening and closing said molds, and means for raising said last out of alinement with said molds when open, substantially as shown and described.

19. In a machine of the class described, the combination with a two-part separable last and a plurality of molds for coöperating therewith, of means for admitting steam into said last to separate the sections thereof when the molds are closed, means for opening and closing said molds, means for raising said last out of alinement with said molds when open, means for stopping said mold opening and closing means and said last-raising means when the molds are closed, and means for opening up the steam-admission to the last when the molds are closed and closing off the steam-admission to the last when the molds are open, substantially as shown and described.

20. In a machine of the class described, the combination with a two-part separable last and a plurality of molds for coöperating therewith, of means for admitting steam into said last to separate the sections thereof when the molds are closed, means for opening and closing said molds, means for raising said last out of alinement with said molds when open, means for stopping said mold opening and closing means and said last-raising means when the molds are closed, means for opening up the steam-admission to the last when the molds are closed and closing off the steam-admission to the last when the molds are opened, and means for automatically restarting the mold opening and closing and the last-raising means at predetermined intervals, and means for disconnecting said starting means when the molds are opened, substantially as shown and described.

21. In a machine of the class described, the combination with a last-support, and a last detachably supported thereon, a plurality of "upper-mold" carriers having molds for coöperating with said last, and a "sole-mold" carrier having a mold for coöperating with said last, of means for opening and closing said "upper-molds" and means for opening and closing said "sole-mold," said "sole-mold" being pivotally mounted and part of the movement thereof in opening and closing being on an arc of a circle having as its center the pivot-axis of the "sole-mold" carrier and the remainder of its movement being at right angles to the movement of the "upper-mold" carriers while lying in a plane parallel to the plane of movement of the "upper-mold" carriers, substantially as shown and described.

22. In a machine of the class described, the combination with a last-support, and a last detachably supported thereon, a plurality of "upper-mold" carriers having molds for coöperating with said last, and a "sole-mold" having a mold for coöperating with said last, of means for opening and closing said "upper-molds," and means for opening and closing said "sole-mold," said "sole-mold" being pivotally mounted, and part of the movement thereof in opening and closing being on an arc of a circle having as its center the pivot-axis of the "sole-mold" carrier, and the remainder of its movement being at right angles to the movement of the "upper-mold" carriers while lying in a plane parallel to the plane of movement of the "upper-mold" carriers, and means for stopping said mold opening and closing means at the limit of each movement thereof, and means for restarting the mold opening and closing means at predetermined intervals after the molds have been closed, substantially as shown and described.

23. In a machine of the class described, the combination with a last-support and a last detachably supported thereon, a plurality of "upper-mold" carriers having molds for coöperating with said last, and a "sole-mold" carrier having a mold for coöperating with said last, of means for opening and closing said "upper-molds," and means for opening and closing said "sole-mold," said "sole-mold" being pivotally mounted, a part of the movement thereof in opening and closing being on an arc of a circle having as its center the pivot-axis of the "sole-mold" carrier and the remainder of its movement being at right angles to the movement of the "upper-mold" carriers while lying in a plane parallel to the plane of movement of the "upper-mold" carriers, means for stopping said mold opening and closing means at the limit of each movement thereof, means for restarting the mold opening and closing means at predetermined intervals after the molds have been closed, and means for disconnecting said restarting means when the molds are opened, substantially as shown and described.

JOHN F. CAVANAGH.

Witnesses:
JOHN L. FLETCHER,
JOHN T. SCHROTT.